(12) United States Patent
Lee et al.

(10) Patent No.: US 10,658,648 B2
(45) Date of Patent: May 19, 2020

(54) ELECTRODE ASSEMBLY INCLUDING ELECTRODE PLATES WITH COUPLED ADDITIONAL TAPS FORMED THEREON

(71) Applicant: LG Chem, Ltd., Seoul (KR)

(72) Inventors: Jung Pil Lee, Daejeon (KR); Eun Bee Kim, Daejeon (KR); Ji Young Kim, Daejeon (KR); Hyeri Jung, Daejeon (KR)

(73) Assignee: LG Chem, Ltd. (KR)

( * ) Notice: Subject to any disclaimer, the term of this patent is extended or adjusted under 35 U.S.C. 154(b) by 222 days.

(21) Appl. No.: 15/765,360

(22) PCT Filed: Jun. 2, 2017

(86) PCT No.: PCT/KR2017/005799
§ 371 (c)(1),
(2) Date: Apr. 2, 2018

(87) PCT Pub. No.: WO2018/012739
PCT Pub. Date: Jan. 18, 2018

(65) Prior Publication Data
US 2018/0315980 A1    Nov. 1, 2018

(30) Foreign Application Priority Data
Jul. 12, 2016  (KR) .......... 10-2016-0088182

(51) Int. Cl.
*H01M 2/26*   (2006.01)
*H01M 10/04*  (2006.01)
(Continued)

(52) U.S. Cl.
CPC ............ *H01M 2/26* (2013.01); *H01M 2/266* (2013.01); *H01M 10/04* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 3,179,538 A * | 4/1965 | Dalin .................. | H01M 10/613 429/181 |
| 2001/0051298 A1 * | 12/2001 | Hanafusa ............ | H01M 2/0207 429/162 |

(Continued)

FOREIGN PATENT DOCUMENTS

| | | |
|---|---|---|
| JP | 5737214 B2 | 6/2015 |
| KR | 20070047651 A | 5/2007 |

(Continued)

OTHER PUBLICATIONS

Extended European Search Report including Written Opinion for Application No. EP17827813.1 dated Jul. 12, 2018.
(Continued)

*Primary Examiner* — Kaity V Chandler
(74) *Attorney, Agent, or Firm* — Lerner, David, Littenberg, Krumholz & Mentlik, LLP (57) ABSTRACT

Disclosed is an electrode assembly with a structure in which a plurality of electrode plates are stacked while a separator is interposed between a positive electrode plate and a negative electrode plate, each of the electrode plates including an electrode tap that externally protrude from one side thereof to form a tap-lead coupler and at least two or more fixing parts that externally protrude from each of electrode plate by a length of 10% to 50% of a length of the electrode tap from the one side and/or the other side, wherein fixing parts with the same polarity, which are positioned in parallel to each other in up and down directions, are bonded to each other to maintain a stack interval between the electrode plates while the electrode plates are stacked.

16 Claims, 8 Drawing Sheets

(51) Int. Cl.
*H01M 10/0585* (2010.01)
*H01M 10/0525* (2010.01)

(52) U.S. Cl.
CPC ..... *H01M 10/044* (2013.01); *H01M 10/0431* (2013.01); *H01M 10/0436* (2013.01); *H01M 10/0525* (2013.01); *H01M 10/0585* (2013.01); *H01M 2220/30* (2013.01)

(56) References Cited

U.S. PATENT DOCUMENTS

| | | | |
|---|---|---|---|
| 2006/0099496 A1* | 5/2006 | Aamodt | H01M 2/18 429/136 |
| 2006/0286452 A1* | 12/2006 | Takamatsu | H01M 2/0212 429/185 |
| 2007/0202399 A1 | 8/2007 | Shin et al. | |
| 2009/0029246 A1* | 1/2009 | Kim | H01M 2/021 429/176 |
| 2011/0129701 A1* | 6/2011 | Seo | H01M 2/263 429/7 |
| 2011/0143189 A1* | 6/2011 | Kim | H01M 2/1646 429/160 |
| 2011/0151307 A1 | 6/2011 | Hwang et al. | |
| 2011/0217591 A1 | 9/2011 | Heo | |
| 2011/0274960 A1* | 11/2011 | Ahn | H01M 2/021 429/136 |
| 2012/0148913 A1* | 6/2012 | Chiba | H01M 2/024 429/179 |
| 2013/0143109 A1* | 6/2013 | Kim | H01M 2/30 429/178 |
| 2013/0196210 A1* | 8/2013 | Kim | H01M 10/0413 429/153 |
| 2014/0295233 A1* | 10/2014 | Daidoji | H01M 2/26 429/94 |
| 2014/0377645 A1 | 12/2014 | Juhn | |
| 2015/0072241 A1 | 3/2015 | Jung et al. | |
| 2015/0180089 A1 | 6/2015 | Min et al. | |
| 2016/0204410 A1* | 7/2016 | Heo | H01M 2/30 429/158 |

FOREIGN PATENT DOCUMENTS

| | | |
|---|---|---|
| KR | 20080009350 A | 1/2008 |
| KR | 100821856 B1 | 4/2008 |
| KR | 20090035328 A | 4/2009 |
| KR | 101223631 B1 | 1/2013 |
| KR | 20130085714 A | 7/2013 |
| KR | 101379985 B1 | 4/2014 |
| KR | 20140103088 A | 8/2014 |
| KR | 20140110132 A | 9/2014 |
| KR | 20150037155 A | 4/2015 |
| KR | 101558702 B1 | 10/2015 |
| KR | 20160010080 A | 1/2016 |
| WO | 2012149467 A1 | 11/2012 |

OTHER PUBLICATIONS

Search report from International Application No. PCT/KR2017/005799, dated Aug. 30, 2017.

* cited by examiner

ELECTRODE ASSEMBLY INCLUDING ELECTRODE PLATES WITH COUPLED ADDITIONAL TAPS FORMED THEREON

CROSS-REFERENCE TO RELATED APPLICATIONS

This application is a national phase entry under 35 U.S.C. § 371 of International Application No. PCT/KR2017/005799, filed Jun. 2, 2017, which claims priority to and the benefit of Korean Patent Application No. 10-2016-0088182 filed in the Korean Intellectual Property Office on Jul. 12, 2016, the entire contents of the disclosures of which are incorporated herein by reference.

TECHNICAL FIELD

The present invention relates to an electrode assembly including electrode plates on which coupled additional taps are formed.

BACKGROUND ART

Along with increase in technological development and demands of mobile devices, the demand for a battery as an energy source has remarkably increased and, accordingly, a large amount of research has been conducted into a battery that meets various demands.

Representatively, there is high demand for a prismatic rechargeable battery and a pouch-type rechargeable battery which have a small thickness to be applicable to products such as mobile phones in terms of a battery shape and there is high demand for a lithium rechargeable battery such as a lithium ion battery and a lithium ion polymer battery with high energy density, discharge voltage, and output stability in terms of a material.

A rechargeable battery is classified according to a structure of an electrode assembly with a positive electrode/separator/negative electrode structure and, representatively, there are a jelly roll (winding type) electrode assembly configured by winding long-sheet type positive and negative electrodes with a separator interposed therebetween, a stack-type electrode assembly configured by sequentially stacking a plurality of positive and negative electrodes which are torn in units of predetermined sizes and between which a separator is interposed, and a stack/folding-type electrode assembly configured by winding bi-cells or full-cells in which a predetermined unit of positive and negative electrodes are stacked with a separator interposed therebetween.

A stack-type electrode assembly is configured by sequentially stacking structures in which a separator is interposed between a positive electrode with a positive active material coated on opposite surfaces of a positive current collector and a negative electrode with a negative active material coated on opposite surfaces of a negative current collector.

In this case, a plurality of positive and negative electrode taps configured with an uncoated area on which an active material is not coated protrude from one-side end of positive and negative electrodes to be electrically connected to positive and negative electrode leads configuring an electrode terminal of a battery, respectively.

These positive and negative electrode taps are formed via notching in which a predicted portion to be coupled to an electrode lead at an uncoated area with no active material coated thereon protrude from a current collector. Positive and negative taps that protrude via notching may be densely coupled to be connected to positive and negative electrode leads, respectively.

Figure 1:
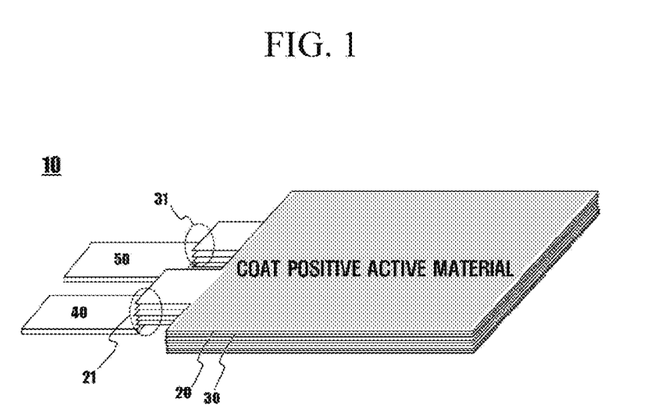
FIG. 1 is a schematic view of a general structure of a conventional stack-type electrode assembly.

In this regard, FIG. 1 schematically illustrates a general structure of a conventional stack-type electrode assembly and a coupling type between electrode taps and electrode leads.

Referring to FIG. 1, a plurality of positive electrode taps 21 that protrude outward from a positive electrode 20 of an electrode assembly 10 and on which a positive active material is not coated and a plurality of negative electrode taps 31 that protrude outward from a negative electrode 30 in the same direction as the positive electrode taps 21 may be connected to, for example, a positive electrode lead 40 and a negative electrode lead 50 in the form of welding portions that are integrally coupled via welding, respectively.

However, in the conventional electrode assembly, a negative active material is coupled to a lithium ion to expand during a charge procedure or gas is generated via decomposition of an electrolyte solution or an electrochemical reaction during a repeated charge and discharge procedure to cause a swelling phenomenon in which a battery swells. Due to stress generated in this case, the volume and thickness of an electrode assembly are changed and, particularly, an outer appearance is also deformed and, furthermore, there is a problem in that performance of a battery remarkably deteriorates.

In addition, when a high-capacity material such as transition elements as well as Si metal is applied to a negative active material to develop a battery cell with a high energy density, very large volume expansion compared with a graphite-based active material is caused and, thus, the above problems are more serious.

Accordingly, there has been a need for an electrode assembly with a structure for implementing a battery with a high energy density and, simultaneously, preventing a swelling phenomenon and electrode deformation due to charge and discharge.

DISCLOSURE

Technical Problem

An object of the present invention is devised to solve the problem of the conventional art and the technical object requested from the past.

In detail, an exemplary embodiment of the present invention provides an electrode assembly that is configured in such a way that a plurality of electrode plates are stacked and a plurality of fixing parts that externally protrude from an electrode plate are bonded to each other to stably maintain a stack state of electrode plates, thereby preventing a swelling phenomenon and the electrode assembly from being deformed.

Technical Solution

According to an exemplary embodiment of the present invention, an electrode assembly with a structure in which a plurality of electrode plates are stacked while a separator is interposed between a positive electrode plate and a negative electrode plate, each of the electrode plates including an electrode tap that externally protrude from one side thereof to form a tap-lead coupler and at least two or more fixing parts that externally protrude from each of electrode plate by a length of 10% to 50% of a length of the electrode tap from the one side and/or the other side, wherein fixing parts with the same polarity, which are positioned in parallel to each other in up and down directions, are bonded to each other to maintain a stack interval between the electrode plates while the electrode plates are stacked.

Accordingly, in an electrode assembly according to the present invention, if swelling occurs in a perpendicular direction to a surface of an electrode plate during a charge and discharge procedure, a swelling degree may be remarkably reduced while a stack interval between electrode plates is maintained by bonded fixing parts with the same polarity. Particularly, it may be noted that, in an electrode assembly according to the present invention, stress is concentrated on fixing parts but not on an electrode plate on which an electrode active material is coated and, accordingly, a conventional problem in which delamination of an electrode active material layer or distortion of an electrode plate due to stress may be overcome.

Considering that the above all problems significantly increase resistance when an electrode assembly is used for a long time, an electrode assembly according to the present invention may be understood to have enhance lifetime characteristic with the aforementioned structure.

According to another aspect, a bonding part of the fixing parts may configure a V-forming structure bent in the shape "V" and, accordingly, a size of an electrode assembly installed in a battery case is not affected and a problem in which a capacity of a battery is reduced may be overcome.

When a length of the fixing part is less than 10% of a length of an electrode tap, it may not be easy to couple couplers and sufficient fixing force may not be expected even if the fixing parts are coupled, which may not be preferable. When a length of a fixing part exceeds 50% of a length of an electrode tap, a dead space is formed in an end portion of an electrode assembly by a length of a protruding fixing part in terms of a battery cell and, accordingly, this may not be preferable in terms of spatial utility.

However, in a procedure of bonding fixing parts and forming a V-forming structure, a length of a fixing part may be adjusted in such a way that a height of a bent bonding part does not exceed a thickness of an electrode assembly.

According to a more preferable exemplary embodiment of the present invention, in consideration of the aforementioned points, a length of the fixing part may be 15 to 45%, 20 to 40%, or 25 to 35% of a length of an electrode tap.

According to the present invention, fixing parts with the same polarity may be bonded to each other via welding or soldering to configure a fixing structure and a welding method may include general resistance welding, ultrasonic welding, laser welding, and so on.

In addition, an insulation tape may additionally surround the bonded fixing parts to strengthen a fixing state. The insulation tape may bind fixing parts and may also ensure electrical insulation of fixing parts with respect to an internal surface of a battery case.

The fixing part may each have, for example, a polygonal structure, an irregular structure with at least one rounded external circumferential side, or a semicircular or half-elliptic curved line structure, on a plane but are not limited to these shapes.

Differently from this, the fixing parts may be formed with a wedge structure in which at least a portion thereof is concave based on a plane or a structure with an opening penetrated therein.

The wedge type fixing part or the fixing part with an opening perforated therein may have more sides for determining a shape thereof on a plane than a rectangular fixing part, for example. These sides may be bonded to each other via welding or soldering and accordingly, the structures may be considered as a structure with a substantially increased bonding area and a bonding boundary of fixing parts. Here, the bonding boundary may refer to an entire length of bonded sides.

Accordingly, a stack structure between electrode plates according to the present invention may be more easily maintained by the wedge type fixing part or the fixing part with an opening perforated therein.

However, in the wedge type fixing part, when a wedge has a sharp shape on a plane, electric charges may be concentrated on a tip part of the wedge to increase resistance and generate heat, which may not be preferable and, accordingly, the wedge may be formed by rounding a tip part thereof on a plane.

In addition, a size of an opening is proportional to resistance formed on a fixing part when current is supplied and, accordingly, to prevent the fixing part from excessively generating heat, it may not be preferable that an area of an opening occupied in the fixing part is excessively wide. For the above reason, a plurality of through holes may not be perforated through an electrode terminal.

Accordingly, the opening may be perforated in the fixing part with a size to occupy a planar area of 5% to 20% of a planar area of an electrode terminal not to deteriorate an electrical connection function of an electrode terminal while providing a sufficient bonding boundary and, in detail, may be perforated in the fixing part to occupy a planar area of 7% to 15% and, for the reason, only one opening may be perforated in the fixing part.

The planar shape of the opening may not be particularly limited as long as including a curved line but may have a circular or ellipse shape and, thereamong, the ellipse opening may be formed on the fixing parts in such a way that a major axis of the ellipse opening corresponds to a perpendicular direction to a direction in which the fixing part protrudes. This structure may be configured in such a way that the major axis with a relatively long length in the ellipse traverses perpendicularly to a direction in which the fixing parts protrude and, in this regard, a length of a bonding interface may be increased in right and left directions based on the direction in which the fixing parts protrude to prevent the bonded fixing parts from being distorted in right and left directions.

An insulation tape may be added to the fixing parts while integrally surrounding wedges while the wedge type fixing parts are collected and, similarly, an insulation tape may continuously pass through an opening of each of the fixing parts and, then, may be added to the fixing parts while integrally surrounding the fixing parts.

Hereinafter, structures of an electrode assembly according to the present invention will be described in detail with regard to unlimited examples.

In one detailed example, the fixing parts may externally protrude toward a side that faces the electrode tap.

Here, a plurality of electrode taps may be bonded to one side of an electrode plate while a tap-lead coupler is formed thereon and fixing parts may be bonded to each other on the other side facing the one side and electrode plates are fixed to opposite ends of the electrode assembly, accordingly, even if swelling occurs, a stack interval between electrode plates may be prevented from being increased and the electrode plates may be prevented from being distorted in right and left directions.

In the above structure, an electrode tap and a fixing part may be wound not to overlap with a separation film and, thus, a plurality of unit cells including at least one positive electrode plate and at least one negative electrode plate may be wound by the separation film to configure a stack-folding type structure.

In one detailed example, the fixing part may be configured to include a first fixing part positioned adjacent to an electrode tap and a second fixing part positioned on the other side except for the one side on which the first fixing part is formed.

In this case, the first fixing part needs to be formed to be spaced apart from an electrode tap by a predetermined interval not to contact an electrode tap and the second fixing part may be formed at an arbitrary point of the other side except for the one side on which the first fixing part is formed to alleviate stress in the electrode assembly, according to the following embodiment.

In one example, the first fixing part may be formed on a first side on which an electrode tap is positioned and the second fixing part may be formed on a second side that faces the first fixing part or may be formed on any one of sides perpendicularly adjacent to the second side.

In more detail, the first fixing part may be positioned on one side of the first side to be inclined based on a central line of a width of an electrode plate and the second fixing part may be formed on the second side to be symmetrical to the first fixing part based on a center of the electrode plate.

For example, when a first fixing part of a positive electrode plate is positioned adjacently to a positive electrode tap and a first fixing part of a negative electrode plate is positioned adjacently to a negative electrode tap, a second fixing part of the positive electrode plate and a second fixing part of the negative electrode plate may be formed on a second side to be respectively symmetrical to first fixing parts of the electrode plates based on a central line of a width of the electrode plate.

Differently from this, the first fixing part may be formed on one side as any one of sides that are perpendicularly adjacent to one side on which the electrode tap is positioned and the second fixing part may be formed on the other side that faces the first fixing part.

In more detail, the first fixing part may be positioned on another aspect of one side to be inclined to a side based on a central line of a length of the electrode plate and the second fixing part may be formed on the other side to be symmetrical to the first fixing part based on a center of the electrode plate.

As another example, the first fixing part may be formed at an intersection between one side on which the electrode tap is positioned and a side that is perpendicularly adjacent to the one side, and the second fixing part may be formed at an intersection between two sides facing the first fixing part.

The electrode assemblies with the above structure may have a winding type stack-folding structure but at least one of the first fixing part or the second fixing part may be formed on a lateral side of an electrode plate and, accordingly, the electrode assemblies may be configured with a stack type structure in which a plurality of electrode plates are sequentially stacked.

The present invention may also provide a battery cell including the electrode assembly and a device including one or more of the battery cells. A manufacturing method of a battery cell and a device structure is well known to the art in which the present invention pertains and, accordingly, is not described in detail in the specification.

MODE FOR INVENTION

Hereinafter, an exemplary embodiment of the present invention is described more fully with reference to the accompanying drawings, in which exemplary embodiments of the invention are shown but should not be construed as limited to the exemplary embodiments set forth herein.

Figure 2:
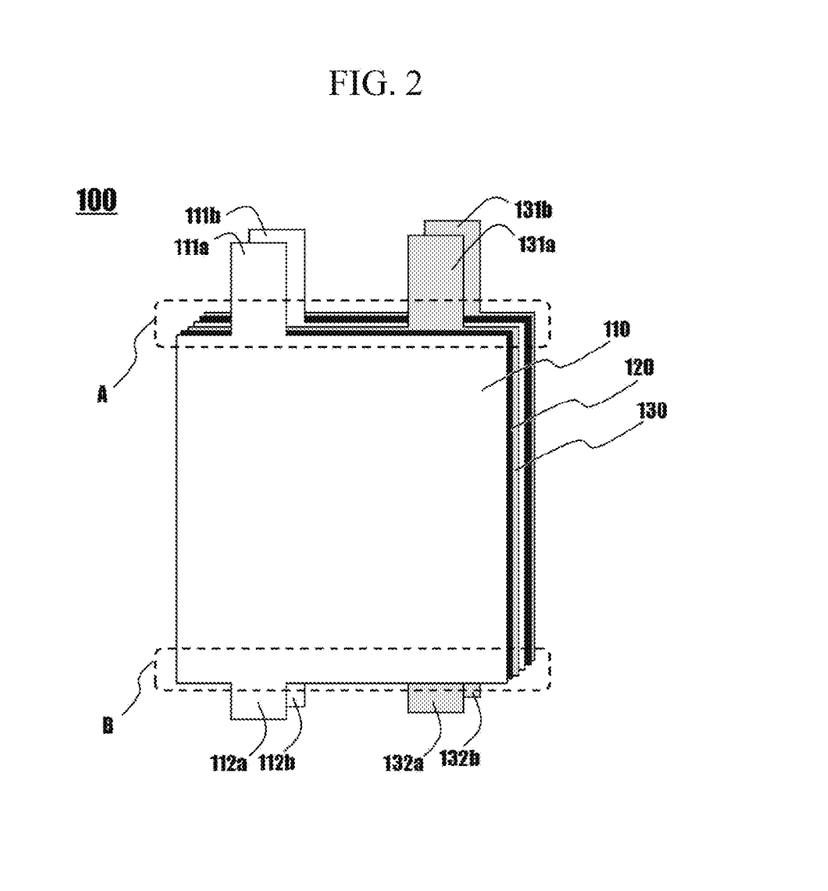
FIG. 2 is a schematic view showing a structure in which positive electrode/separator/negative electrode including fixing parts are stacked according to an exemplary embodiment of the present invention.
Figure 3:
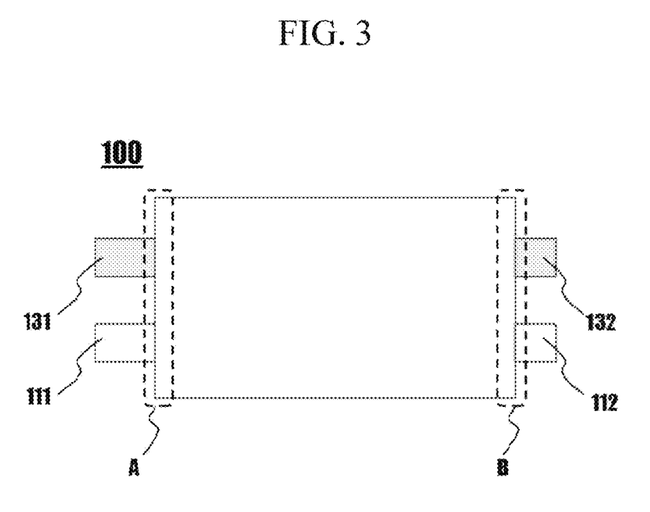
FIG. 3 is a plan view of the electrode assembly of FIG. 2.
Figure 4:
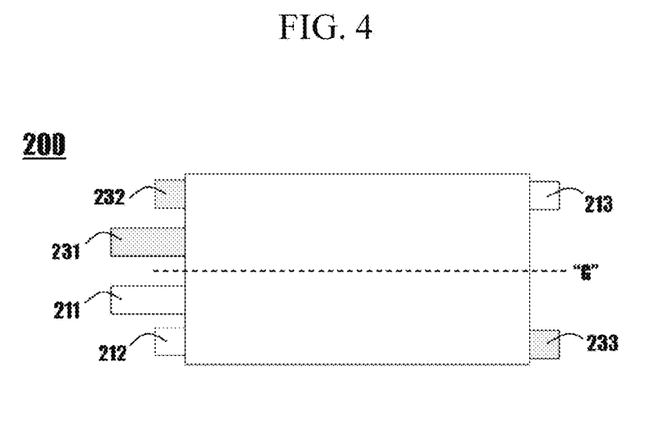
FIGS. 4 to 6 are schematic views of an electrode assembly according to an exemplary embodiment of the present invention.

FIG. 2 is a schematic view showing a structure in which positive electrode/separator/negative electrode including fixing parts are stacked according to an exemplary embodiment of the present invention and FIG. 4 is a plan view of the electrode assembly of FIG. 2.

Referring to both FIG. 3 and FIG. 4, an electrode assembly 100 according to the present invention may include electrode taps 111 and 131 and fixing parts 112 and 132.

The electrode assembly 100 may be configured by repeatedly stacking a positive electrode plate 110/separator 120/negative electrode plate 130 and, positive electrode taps 111a and 111b and negative taps 131a and 131b for forming an electrode lead (not shown) and a tap-lead coupler may protrude outward from one side A of the positive electrode plate 110 and the negative electrode plate 130, respectively.

Positive electrode fixing parts 112a and 112b and negative electrode fixing parts 132a and 132b for maintaining a stack interval between the electrode plates 110 and 130 may be formed at the other side B opposite to the one side A at which the electrode taps 111a, 111b, 131a, and 131b are formed, fixing parts with the same polarity are bonded to each other via welding or soldering while being arranged in parallel in up and down directions to suppress swelling and to relieve stress generated in an electrode assembly.

In detail, opposite lateral surfaces of the electrode plates 110 and 130 may configure a fixing structure using a bonding structure of tap-lead couplers 111 and 131 and the fixing parts 112 and 132 to effectively suppress widening of a gap between electrode plates compared with a conventional electrode assembly including only a tap-lead coupler.

The electrode assembly may be arranged on a separation film (not shown) at a lateral surface on which electrode taps 111 and 131 and the fixing parts 112 and 132 are not formed and, accordingly, a plurality of unit cells including at least one positive electrode plates and at least one negative electrode plates may be wounded using the separation film.

Figure 5:
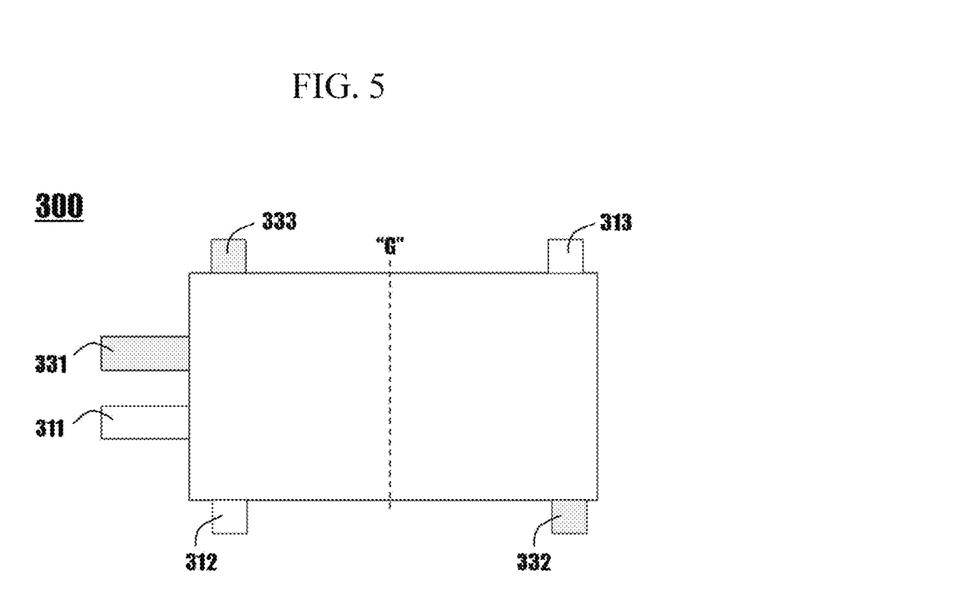
Figure 6:
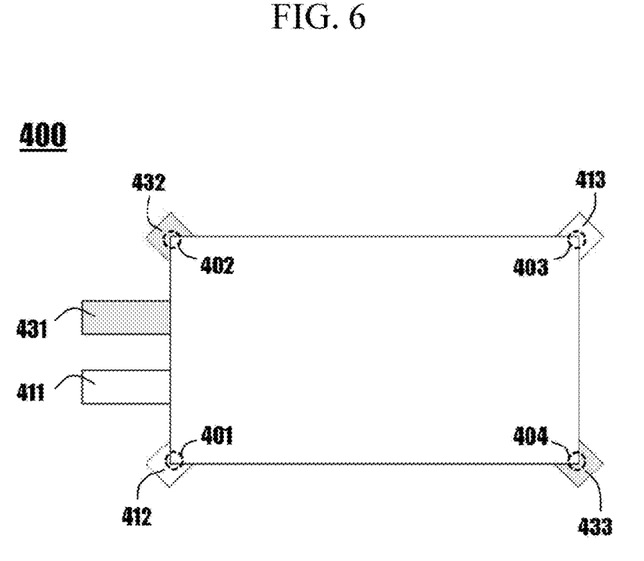

FIGS. 4 to 6 are schematic views of an electrode assembly according to an exemplary embodiment of the present invention.

Referring to FIG. 4, the electrode assembly 200 may include electrode taps 211 and 231, first fixing parts 212 and 232 that are formed on the same first side while being adjacent to the electrode taps 211 and 231, and second fixing parts 213 and 233 formed on a second side opposite to the first side.

In detail, the first fixing parts 212 and 232 may include a first positive electrode fixing part 212 and a first negative electrode fixing part 232 and may be spaced apart from a positive electrode tap 211 and a negative electrode tap 231 by a predetermined interval, respectively. Similarly, the second fixing parts 213 and 233 may include a second positive electrode fixing part 213 and a second negative electrode fixing part 233.

The first fixing parts 212 and 232 may each be positioned on one side of the first side to be inclined based on a central line "G" of a width of an electrode plate and the second fixing parts 213 and 233 may be formed on the second side to be symmetrical to the first fixing parts 212 and 232, respectively.

Referring to FIG. 5, the electrode assembly 300 may include electrode taps 311 and 331, first fixing parts 312 and 332 formed on a first side that is perpendicularly adjacent to one side on which the electrode taps 311 and 331 are formed, and second fixing parts 313 and 333 formed on a second side opposite to the first side.

In detail, the first fixing parts 312 and 332 may include a first positive electrode fixing part 312 and a first negative electrode fixing part 332 and the second fixing parts 313 and 333 may include a second positive electrode fixing part 313 and a second negative electrode fixing part 333.

The first fixing parts 312 and 332 may each be positioned on one side of the first side to be inclined based on a central line "G" of a length of an electrode plate and the second fixing parts 313 and 333 may be formed on the second side to be symmetrical to the first fixing parts 312 and 332, respectively.

Referring to FIG. 6, the electrode assembly 400 may include electrode taps 411 and 431, first fixing parts 412 and 432 formed at intersections 401 and 402 between one side on which the electrode taps 411 and 431 are formed and another side that is perpendicularly adjacent to the one side, and second fixing parts 413 and 433 formed at intersections 403 and 404 between two sides that face the first fixing parts.

In detail, the first fixing parts 412 and 432 may include a first positive electrode fixing part 412 and a first negative fixing part 432 and the second fixing parts 413 and 433 may include a second positive electrode fixing part 413 and a second negative electrode fixing part 433.

The electrode assembly shown in FIGS. 5 and 6 may be configured in such a way that a fixing part is formed at a lateral side part of an electrode plate and, thus, may be configured in a stack type in which a plurality of electrode plates are sequentially stacked.

Figure 7:
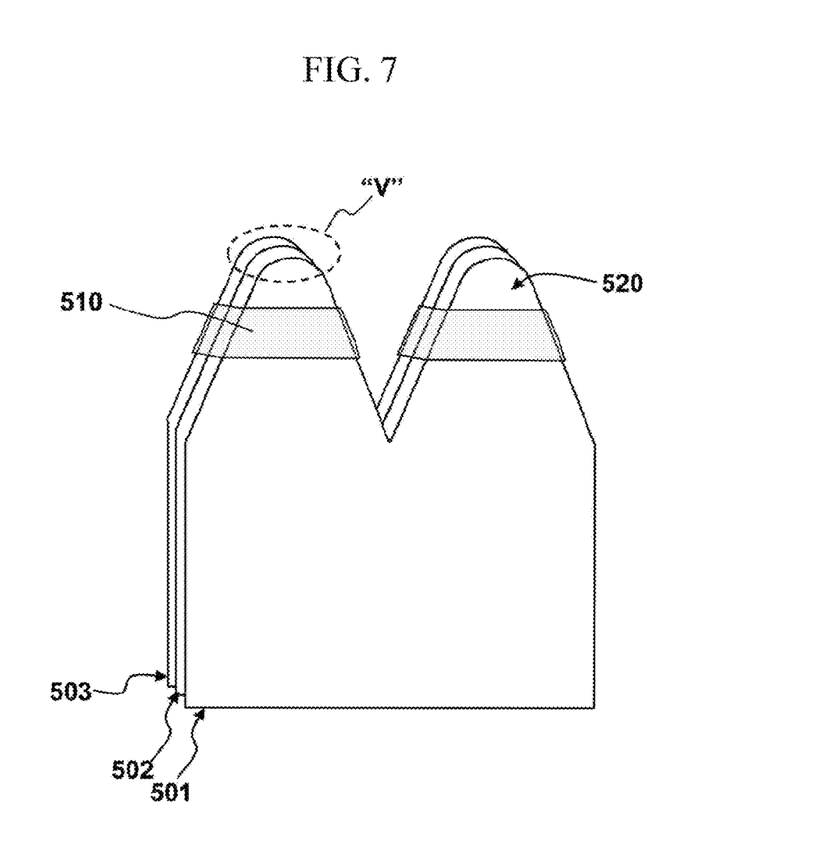
FIG. 7 is a schematic enlarged view of fixing parts according to an exemplary embodiment of the present invention.
Figure 8:
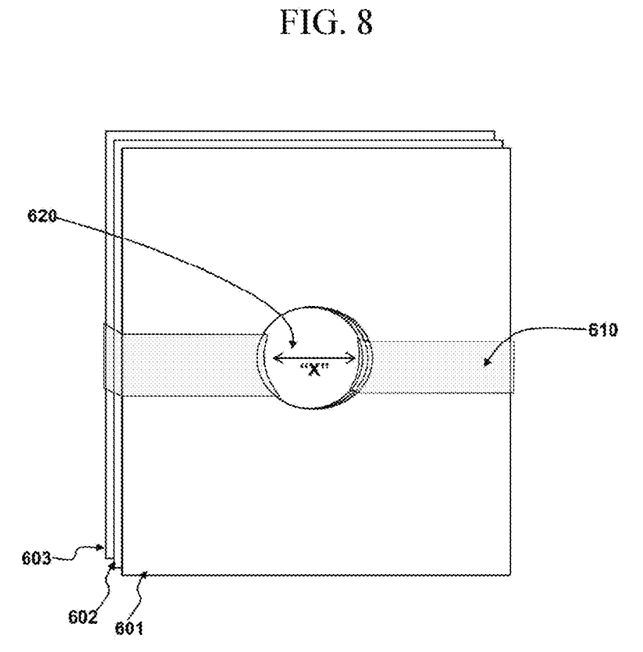
FIG. 8 is a schematic enlarged view of fixing parts according to an exemplary embodiment of the present invention.

FIGS. 7 and 8 are schematic enlarged views of fixing parts according to exemplary embodiments of the present invention.

First, referring to FIG. 7, fixing parts 501, 502, and 503 may be formed with a wedge 520, a portion of which is concave on a plane and the other non-concave portions of which protrude toward one side.

Here, it may be noted that the wedge 520 is formed by rounding a tip part "V" thereof on a plane.

When the wedge 520 has a sharp shape, electric charges may be concentrated on the tip part "V" to increase resistance and generate heat and to also damage a battery case adjacent to the fixing parts 501, 502, and 503 as well as the electrode plate and, accordingly, the above rounded structure of the wedge 520 may be particularly preferable.

Referring back to FIG. 7, the wedge type fixing parts 501, 502, and 503 may be integrally bonded via welding or soldering while being stacked to overlap with each other in a vertical direction.

The fixing part shown in FIG. 7 may further include, for example, sides formed thereon for determining a shape of the wedge 520 on a plane compared with four sides of a quadrangular fixing part on a plane and, in this regard, the sides may also be bonded via welding or soldering and, accordingly, a bonding area and bonding boundary of the fixing parts 501, 502, and 503 may be relatively increased.

In addition, an insulation tape 510 may be added to the fixing parts 501, 502, and 503 while surrounding only the wedges 520 in a state in which the wedge type fixing parts 501, 502, and 503 are collected and, accordingly, a bonding state of the fixing parts 501, 502, and 503 may be more fixedly maintained.

Although not shown in drawings, an insulation tape may also be added to the remaining fixing parts other than the wedge 520 as well as the wedge 520.

Differently from FIG. 7 above, fixing parts 601, 602, and 603 shown FIG. 8 may each have an overall rectangular shape and may include an opening 620 formed therethrough and perforated through a central portion thereof.

Accordingly, openings 620 of each of the fixing parts 601, 602, and 603 may be aligned to correspond to each other while the fixing parts 601, 602, and 603 overlap with each other and, in this state, the fixing parts 601, 602, and 603 may be bonded to each other via welding or soldering.

The fixing part shown in FIG. 8 may further include, for example, a side with the opening 620 formed therein compared with a fixing part including four sides shaped like a simple quadrangle and, in this regard, the sides may also be bonded via the opening 620 via welding or soldering and, accordingly, a bonding area and a bonding boundary may be relatively increased.

As shown in FIG. 8, an insulation tape 610 may continuously pass through the collected openings 620 and, then, may be added to fixing parts 601, 602, and 603 while integrally surrounding the fixing parts 601, 602, and 603 and, accordingly, a bonding state of the fixing parts 601, 602, and 603 may be more stably maintained.

The opening 620 may be shaped like an ellipse and may be formed on the fixing parts 601, 602, and 603 while a major axis "X" of the ellipse corresponds to a perpendicular direction to a direction in which the fixing part protrudes.

This structure may be configured in such a way that the major axis "X" with a relatively long length in the ellipse traverses perpendicularly to a direction in which the fixing parts 601, 602, and 603 protrude and, in this regard, a length of a bonding interface may be increased in right and left directions based on the direction in which the fixing parts 601, 602, and 603 protrude to prevent the bonded fixing parts 601, 602, and 603 from being distorted in right and left directions.

Various applications and modifications may be obvious to one of ordinary skill in the art to which the present invention pertains based on the above description within the scope of the present invention.

INDUSTRIAL APPLICABILITY

As described above, in an electrode assembly according to the present invention, if swelling occurs in a perpendicular direction to a surface of an electrode plate during a charge and discharge procedure, a swelling degree may be remarkably reduced while a stack interval between electrode plates is maintained by bonded fixing parts with the same polarity and, particularly, stress is concentrated on fixing parts but not on an electrode plate on which an electrode active material is coated and, accordingly, a conventional problem in which delamination of an electrode active material layer or distortion of an electrode plate due to stress may be overcome.

The invention claimed is:

1. An electrode assembly comprising:
a plurality of electrode plates stacked while a separator is interposed between a positive electrode plate and a negative electrode plate of the plurality of electrode plates,
wherein each of the electrode plates includes an electrode tap that externally protrudes from one side thereof to form a tap-lead coupler and at least two or more fixing parts that externally protrude by a length of 10% to 50% of a length of the electrode tap from the one side and/or the another side thereof,
wherein fixing parts of the at least two or more fixing parts with the same polarity, which are positioned in parallel to each other in up and down directions, are bonded to each other to maintain a stack interval between the electrode plates while the electrode plates are stacked,
wherein each of the fixing parts includes an opening perforated therein, and
wherein an insulation tape continuously passes through the opening of each of the fixing parts and surrounds the fixing parts.

2. The electrode assembly of claim 1, wherein the fixing parts externally protrude toward a side of the respective electrode plate that faces the electrode tap.

3. The electrode assembly of claim 2, wherein the electrode assembly is configured with a stack-folding type structure in which a plurality of unit cells including at least one positive electrode plate and at least negative electrode plate are wounded by a separation film.

4. The electrode assembly of claim 1, wherein the fixing parts include a first fixing part positioned adjacently to an electrode tap and a second fixing part positioned on another side different than the one side on which the first fixing part is formed.

5. The electrode assembly of claim 4, wherein:
the first fixing part is formed on a first side on which an electrode tap is positioned; and
the second fixing part is formed on a second side that faces the first fixing part or is formed on any one of sides that are perpendicularly adjacent to the second side.

6. The electrode assembly of claim 5, wherein:
the first fixing part is positioned on one side of the first side to be inclined based on a central line of a width of the electrode plate; and
the second fixing part is formed on a second side to be symmetrical to the first fixing part based on a center of the electrode plate.

7. The electrode assembly of claim 4, wherein:
the first fixing part is formed on one side as any one of sides that are perpendicularly adjacent to one side on which the electrode tap is positioned; and
the second fixing part is formed on another side that faces the first fixing part.

8. The electrode assembly of claim 7, wherein:
the first fixing part is positioned on one side of the first side to be inclined to a side based on a central line of a length of the electrode plate; and
the second fixing part is formed on another side to be symmetrical to the first fixing part based on a center of the electrode plate.

9. The electrode assembly of claim 4, wherein:
the first fixing part is formed at an intersection between one side on which the electrode tap is positioned and a side that is perpendicularly adjacent to the one side; and
the second fixing part is formed at an intersection between two sides facing the first fixing part.

10. The electrode assembly of claim 4, wherein the electrode assembly is configured with a stack type in which a plurality of electrode plates are sequentially stacked.

11. The electrode assembly of claim 1, wherein the fixing parts with the same polarity are bonded to each other via welding or soldering.

12. The electrode assembly of claim 1, wherein the fixing parts each have a polygonal structure, an irregular structure with at least one rounded external circumferential side, or a semicircular or half-elliptic curved line structure, on a plane.

13. The electrode assembly of claim 1, wherein the fixing parts are each formed with a wedge structure in which at least a portion thereof is concave on a plane.

14. The electrode assembly of claim 13, wherein an insulation tape is added to the fixing parts while integrally surrounding wedges while the fixing parts are collected.

15. A battery cell comprising the electrode assembly of claim 1.

16. A device comprising one or more of the battery cell of claim 15.

* * * * *